C. S. HELLER.
PROCESS FOR RECLAIMING VULCANIZED RUBBER WASTE.
APPLICATION FILED FEB. 25, 1910.
978,584. Patented Dec. 13, 1910.
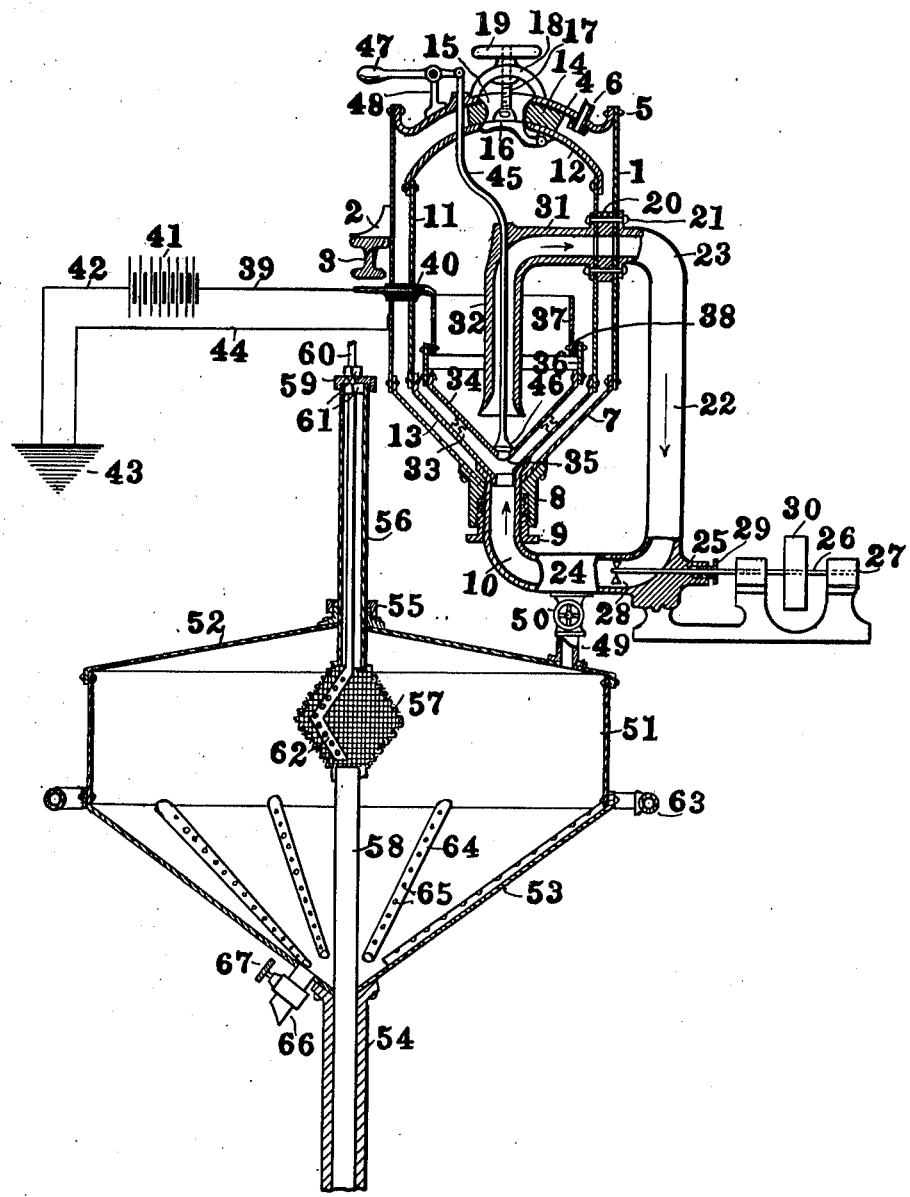
Witnesses:
Glenara Fox
A. E. Kling
INVENTOR-
Charles S. Heller
C. E. Humphrey
BY
ATTORNEY.

UNITED STATES PATENT OFFICE.

CHARLES S. HELLER, OF BARBERTON, OHIO, ASSIGNOR TO THE MOORE ARCHITECTURAL AND ENGINEERING COMPANY, OF AKRON, OHIO, A CORPORATION OF OHIO.

PROCESS FOR RECLAIMING VULCANIZED-RUBBER WASTE.

978,584.     Specification of Letters Patent.     Patented Dec. 13, 1910.

Application filed February 25, 1910. Serial No. 545,960.

REISSUED

*To all whom it may concern:*

Be it known that I, CHARLES S. HELLER, a citizen of the United States, residing at Barberton, in the county of Summit and State of Ohio, have invented new and useful Improvements in Processes for Reclaiming Vulcanized-Rubber Waste, of which the following is a specification.

This invention relates to improvements in processes for re-claiming rubber waste and the object thereof is to provide a new and improved process for removing from the rubber waste the materials which have been previously mixed with the gum to produce vulcanization thereof, and other materials added to the gum to increase the weight, reduce the cost, or improve the qualities of the vulcanized article and at the same time to eliminate as far as possible the fibrous material which has been incorporated therewith during the manufacture thereof, especially in the form of fabric.

This improved process for re-claiming rubber waste, comprises the subjecting of the rubber waste, preferably in a comminuted condition to the action of a re-claiming solution in the presence of heat and simultaneously subjecting the same to an electrolytic action of a current of electricity of a determined degree of intensity and quality, passed through the re-claiming solution to assist in the disintegration of the rubber waste and the removal and elimination therefrom of foreign matters contained therein, and followed by subjecting the rubber to a thorough cleansing operation to subsequently remove from the rubber waste all traces of the re-claiming solution, which in this process is of such a nature that its presence in the finished rubber will be deleterious thereto.

In carrying into effect my improved process I employ certain mechanical structures by which the subjecting of the rubber waste to the re-claiming process is carried out and the subsequent elimination of the re-claiming solution from the rubber waste is accomplished.

A preferred form of apparatus for carrying out my improved process is shown in the accompanying drawing which forms a part hereof, but it is to be understood that various changes and modifications may be employed for carrying out my process without departing from the scope of this invention.

The drawing presented is a vertical, central sectional view of an approved form of apparatus used in connection with my process for re-claiming rubber waste.

Briefly describing the mechanical structure used in connection with this process the reference numeral 1 denotes a metallic cylinder, preferably supported by one or more brackets 2 secured to the outer face of the cylinder 1 and resting upon I beams 3. The upper end of the cylinder 1 is usually closed by means of a head 4 secured to the upper end of the cylinder 1 by rivets 5 and the head is further provided with a steam inlet pipe 6. The lower end of the cylinder 1 is provided with a conically-formed bottom 7 to which is secured a member 8 provided with a central aperture communicating through a suitably-formed opening in the conical end of the cylinder with the interior thereof. The member 8 is provided with an enlarged threaded recess to receive a second member 9 exteriorly-threaded to coöperate therewith and form a stuffing box for the end of a pipe 10 positioned therein, the upper end of the latter extending into the interior of the cylinder 1. Within the cylinder 1 and spaced therefrom to form between them a steam chamber is a tank 11 the upper end of which is closed by a head 12 and having at its lower end a conically-formed portion 13 approximately-parallel with the conical end of the cylinder 1 and with a depending pipe at the apex thereof communicating with the upper end of the pipe 10. The heads 4 and 12 of the cylinder 1 and tank 11 are provided with alined openings and between said heads and surrounding said openings is an apertured collar 14 the aperture 15 in which constitutes an opening through which access may be had to the interior of the tank 11. The opening 15 is closed through the medium of a swinging door 16, preferably hinged to the inner face of the head 12 and normally held in a closed position by means of a threaded hook bolt 17 engaging said door and rotatably-mounted in a brace 18 bridging said opening and mounted on the outer face of the head 4, said bolt being drawn up to close said door by means of a hand nut 19. The side walls of the cylinder 1 and tank 11 are provided with laterally-registering openings and between them and having an opening in registering relation therewith is a collar 20. Secured to the outer face of the cylinder 1 by means of bolts 21 is the flanged end of a pipe 22 having an elbow 23 from which depends a vertical portion connecting with a horizontal pipe 24 by an elbow. Extending through a lug 25 formed on the latter elbow at the lower end of the pipe 22 is a shaft 26 mounted in bearings 27 and provided at its inner end with a propeller 28. The lug 25 is provided with a stuffing box 29 to prevent leakage of liquid from the pipe 22 outwardly along the shaft 26. The shaft 26 is also provided with a pulley 30 to receive a belt by which the propeller 28 is revolved.

On the inner face of the tank 11 and oppositely-disposed with respect to the flanged end of the pipe 22 is a pipe 31 having a portion thereof extending inwardly horizontally from which depends a portion 32 arranged vertically and centrally with respect to the tank 11, the interior of the pipe 31 being in open communication with the interior of the pipe 22. Positioned centrally within the tank 11 and supported by spacing members 33 is an inverted, conically-formed member 34 having an opening 35 at the apex thereof in alinement with the pipe 10. The inverted, conically-formed portion 34 is provided with an upwardly-extending cylindrical portion 36. Supported by the cylindrical portion 36 is an annulus 37 preferably formed of zinc and insulated from the member 36 by a member 38 and preferably somewhat smaller in diameter than the member 36. Connected with the zinc annulus 37 is a wire 39 passing through the wall of the tank 11 and cylinder 1 and protected therefrom by an insulating member 40 and connecting with one pole of an electric current-generating device 41, from the opposite pole of which extends another wire 42 to the ground 43. The cylinder 1 is connected with the ground by a wire 44. The ground 43 is preferably employed to complete the circuit between the wires 42 and 44, but of course any other means for uniting the outer ends of said wires may be employed which is deemed best. Arranged centrally within the pipe 32 is a vertically-shiftable valve stem 45 having at its lower end a valve 46, arranged when in its operative position to close the opening 35 in the conical member 34, and when raised to an inoperative position to permit passage of a fluid through said opening. The upper end of the valve-stem 45 passes upwardly through the heads 4 and 12 of the cylinder 1 and tank 11, respectively, and is connected with one end of an operating lever 47 pivotally-mounted on a post 48, which in turn is mounted on the upper face of the head 4 of the cylinder 1. The opposite end of the lever 47 is provided with a hand grasp by which the valve-stem 45 and valve 46 are shifted.

The cylinder 1 and tank 11 are arranged to constitute a receptacle for a re-claiming solution and the comminuted rubber waste to be acted upon by said solution, and the space between the cylinder 1 and tank 11 constitutes a heating chamber by which the contents of the receptacle are brought to a desired temperature to carry out the process to be hereinafter described.

Communicating with the pipe 24 at any desired point is a discharge pipe 49 provided with a valve 50, and connected with the lower end of the pipe 49 and in open communication therewith is a cleansing tank comprising a cylindrical, medial portion 51, a conically-formed cover 52 and an inverted, conically-formed bottom 53, the latter terminating in a discharge pipe 54 secured to the latter at the apex thereof. The cover 52 is provided with a stuffing box 55 at its apex to receive a vertically-shiftable upwardly-extending pipe 56 having secured to the lower end thereof a drum-shaped member 57 formed of wire cloth from which depends a drain tube 58 extending into and telescoping the pipe 54. Mounted on the upper end of the pipe 56 is a cap 59 provided with an aperture through which extends a tube 60 held in position by nuts 61 placed above and below the cap 59. The pipe 60 extends downwardly into the member 57 and terminates in a bent nozzle 62 provided with a plurality of minute openings so placed and shaped that jets of fluid issuing therefrom will impinge against the sides of the drum-shaped member 57 and tend to remove all particles of matter adhering to the outer surface thereof. This nozzle conforms generally in shape with the side walls of the member 57 and is arranged to be revolved with the pipe 60 as an axle. Surrounding the cylindrical portion 51 of the cleansing tank is a steam pipe 63 from which extend inwardly through the wall 51 of the tank a plurality of steam pipes 64. These pipes 64 are preferably arranged radially to the cleansing tank and lie on the bottom thereof and each is provided with a plurality of openings 65. The bottom 53 is provided near its apex with a discharge opening 66 closed by a gate 67.

In carrying out this process a sufficient quantity of re-claiming solution and comminuted rubber waste is placed within the receptacle to cover the pipe 31, previous to which the valve 46 is shifted to close the opening 35. The re-claiming solution which I preferably use for each one hundred (100) pounds of comminuted rubber waste is six hundred (600) pounds of water by weight, twenty-one (21) pounds of sodium hydrate, (NaOH), or potassium hydrate (KOH) and one (1) pound of ferric sulfate, $Fe_2(SO_4)_3$. The solution in the tank is kept constantly heated by live steam introduced to the steam chamber between the cylinder 1 and tank 11 from the pipe 6. The efficiency of the action of the re-claiming solution upon the comminuted rubber waste during the carrying out of this process is increased by constantly maintaining the contents of the tank in the receptacle in a heated condition, preferably from 330° to 370° F., but experience has found that 360° is the preferred temperature, which is accomplished by introducing steam to the steam chamber at a pressure of from ninety-five (95) to one hundred and sixty (160) pounds. During the time that the comminuted rubber waste and solution are within the receptacle and subjected to the action of both heat and pressure, motion is communicated to the shaft 26 by means of a belt applied to the pulley 30 to produce sufficient revolution of the propeller 28 to cause the solution and comminuted rubber waste to pass through the pipe 10 in the direction of the arrows, and as rapidly as said solution passes through the pipe 10 it escapes through the space between the conical portion 13 of the tank 11 and the conical member 34 and from thence upwardly around the zinc annulus 37 and from thence into the interior of the same. The action of the propeller in forcing the solution and comminuted rubber waste through the pipe 10 withdraws the solution and comminuted rubber waste contained in the conical member 34 upwardly through the pipes 32 and 31 into the pipe 22 from whence it descends to the pipe 24 and is again forced upwardly through the pipe 10. During the passage of the solution and comminuted rubber waste it is constantly agitated and is brought into immediate contact with the wall of the tank 11, especially its conical portion 13, so as to receive all possible heat conducted through the wall of the receptacle from the steam chamber and is thus constantly maintained in a heated condition and under pressure by reason of the temperature to which the solution is raised. During its movement with the solution, the rubber waste in passing between the zinc annulus 37 and the wall of the tank 11 is subjected to the action of an electric current generated by the current-generating device 41, which is connected both with the zinc annulus by the wire 39 and by other current-conducting means with the receptacle containing the solution and from which the zinc annulus is insulated, the zinc annulus constituting to a certain extent a cathode and the wall of the receptacle an anode.

Experience has shown that the major portion of vulcanized rubber waste subjected to the action of the re-claiming process carries a large percentage of mineral and metallic matter, especially sulfur, and the action of an electric current passing through the solution which is rendered electropositive as far as possible by the inclusion of a small percentage of ferric sulfate tends to disintegrate the rubber waste to remove metallic matters, etc., contained therein. The sulfur which is removed from the rubber waste is, through the influence of the chemical solution in which it is contained, together with the electrolytic action of the current, converted into a soluble combination which is carried away in the form of a solution and without going into a detailed description of the peculiar electrolytic action of the current passed through the solution and acting upon the rubber waste, it will be stated that remarkable results have been obtained by the use of an electric current in the elimination of the deleterious matters carried by the rubber which have been incorporated therewith previous to the vulcanization thereof and the removal of which conditions the rubber and prepares it for use in as nearly as possible its original gummy condition which it possessed previous to its initial vulcanization.

When the described process of agitating comminuted rubber in a re-claiming agent within a receptacle in the presence of heat and under pressure and subject to the action of an electric current has been carried on a sufficient length of time, which is usually from ten to twenty-four hours, the valve 46 is raised to permit the matter contained in the conical member 34 to pass into the pipe 10 and from thence to the pipe 24. The gate 50 is then opened allowing the solution and rubber waste to discharge into the cleansing tank 11 through the pipe 49.

The cleansing tank may preferably be filled with pure hot water to remove as far as possible all chemicals, especially the caustic alkalies used for re-claiming the rubber and separating the deleterious matters therefrom.

In order to increase the effectiveness of the water in the cleansing operation, live steam is turned into the annular pipe 63 from whence it passes to the pipe 64 and escapes through the orifices 65 and the force of the steam in jets issuing from the orifices 65 will tend to keep the solution in the cleansing tank centrally agitated. After the cleansing process has been carried on for a sufficient length of time the member 57 and pipe 58 are lowered sufficiently to cause the member 57 to be submerged in the solution which passes through the foraminous wall thereof and escapes through the medium of the pipe 58, leaving the comminuted rubber waste within the cleansing tank. After the major portion of the liquid has been removed by the member 57, the latter is raised and fresh water turned in the pipe 60 from whence it escapes through the orifices in the nozzle 62; at the same time the nozzle is preferably rotated to cause the jets of water projected thereby to pass through the foraminous body of the member 57 and clean the same. After a sufficient quantity of water has been placed in the tank, steam is again turned into the pipes 64 from the pipe 63 and the process renewed and this is repeated until all the solution employed for re-claiming the rubber, especially the caustic alkali, has been removed from the comminuted rubber waste, after which and preferably while there is a considerable quantity of water in the cleansing tank, the gate 67 is opened and the water and comminuted rubber particles are permitted to escape by the discharge pipe 66 onto suitable screens, after which the rubber waste is dried and is ready for use.

It will be apparent that the thorough cleansing of the rubber waste after the re-claiming process has taken place becomes absolutely necessary in order to arrest disintegrating action of the caustic alkalies employed for removing the sulfur and other substances incorporated with the rubber gum previous to the vulcanization thereof, and at the same time a large percentage of the fabric contained in the rubber waste is also washed therefrom.

It will be especially noted that the agitation of the re-claiming solution within the receptacle is of such a nature as to expose all particles of the comminuted rubber to the action of the electric current described and experience has shown that a current of 4 6/10 volts and from 700 to 1000 amperes in strength, is preferred in producing the disintegration necessary in the re-claiming process and to effectually remove the metal and mineral matter contained in the rubber.

I claim:

1. That improvement in the art of re-claiming rubber which consists in subjecting vulcanized rubber waste to the action of a solution containing a caustic alkali and ferric sulfate in the presence of heat and under pressure and subjecting said waste simultaneously to agitation and the action of an electric current and afterward washing said waste to remove the re-claiming agents therefrom.

2. That improvement in the art of re-claiming vulcanized rubber waste which consists in agitating said rubber waste in a comminuted condition while in a solution containing a caustic alkali and ferric sulfate in a heated condition and under pressure and simultaneously subjecting said waste to the action of an electric current and afterward washing the same to remove the re-claiming agents therefrom.

3. That improvement in the art of re-claiming rubber which consists in subjecting vulcanized rubber waste, in a comminuted condition to the action of a solution containing a caustic alkali and ferric sulfate, continuously heating said solution and subjecting the same to pressure and agitation and simultaneously to the action of an electric current and afterward thoroughly washing said waste to remove all trace of the re-claiming agents therefrom.

4. That improvement in the art of re-claiming rubber which consists in commingling vulcanized rubber waste in a comminuted condition with a solution containing a caustic alkali and ferric sulfate, forcing said commingled waste and solution continuously through a heated receptacle to maintain said solution and waste at a proper temperature to cause the separation of the vulcanizing agents therefrom and simultaneously subjecting said waste to the action of an electric current and afterward withdrawing said solution and rubber waste from said receptacle and washing the same to remove the re-claiming agents therefrom.

5. That improvement in the art of re-claiming rubber which consists in commingling vulcainzed rubber waste in a comminuted condition with a solution containing for each one hundred (100) pounds of rubber waste twenty-one (21) pounds of a caustic alkali, six hundred (600) pounds of water and one (1) pound of ferric sulfate, maintaining said solution in a heated condition and under pressure and subject to agitation during the re-claiming process and simultaneously passing an electric current through said rubber waste while contained in said solution and afterward washing said solution to remove the re-claiming agents therefrom.

In testimony whereof I have hereunto set my hand in presence of two subscribing witnesses.

CHARLES S. HELLER.

Witnesses:
 C. E. HUMPHREY,
 GLENARA FOX.